(12) United States Patent
Sasaki et al.

(10) Patent No.: US 7,133,110 B2
(45) Date of Patent: Nov. 7, 2006

(54) LCD DEVICE HAVING PILLAR SPACERS IN A CELL GAP RECEIVING LIQUID CRYSTAL

(75) Inventors: Takeshi Sasaki, Tokyo (JP); Takahisa Hannuki, Tokyo (JP)

(73) Assignee: NEC Corporation, Tokyo (JP)

(*) Notice: Subject to any disclaimer, the term of this patent is extended or adjusted under 35 U.S.C. 154(b) by 316 days.

(21) Appl. No.: 10/269,979

(22) Filed: Oct. 15, 2002

(65) Prior Publication Data
US 2003/0071956 A1  Apr. 17, 2003

(30) Foreign Application Priority Data
Oct. 16, 2001  (JP) ............................. 2001-317593

(51) Int. Cl.
*G02F 1/1339*  (2006.01)
(52) U.S. Cl. ........................ 349/156; 349/155
(58) Field of Classification Search ............... 349/156, 349/155
See application file for complete search history.

(56) References Cited

U.S. PATENT DOCUMENTS 5,539,545 A * 7/1996 Shimizu et al. ............ 349/86
6,038,006 A * 3/2000 Sasaki et al. ............... 349/106
6,330,049 B1 * 12/2001 Kume et al. ................ 349/156
2001/0026347 A1 * 10/2001 Sawasaki et al. .......... 349/156

FOREIGN PATENT DOCUMENTS

| JP | 10-096955 | 4/1998 |
| JP | 2002-072220 | 3/2002 |
| JP | 2002-214624 | 7/2002 |
| JP | 2003-015137 | 1/2003 |

* cited by examiner

Primary Examiner—Tarifur R. Chowdhury
(74) Attorney, Agent, or Firm—McGinn IP Law Group, PLLC (57) ABSTRACT

A LCD device includes a plurality of pillar spacers disposed within liquid crystal for achieving a uniform cell gap between the color filter panel and the TFT panel of the LCD device. The pillar spacers are formed on the color filter panel and abut the TFT panel at a portion of the gate electrode exposed from an opening of an organic overcoat.

21 Claims, 7 Drawing Sheets

LCD DEVICE HAVING PILLAR SPACERS IN A CELL GAP RECEIVING LIQUID CRYSTAL

BACKGROUND OF THE INVENTION (a) Field of the Invention

The present invention relates to a liquid crystal display (LCD) device having a uniform cell gap, and more particularly, to an improvement in the structure of pillar spacers being disposed in the liquid crystal of the LCD device.

(b) Description of the Related Art

LCD devices have been increasingly used in a variety of applications. The LCD device has a pair of opposing panels which define therebetween a cell gap for receiving therein liquid crystal. A pair of electrodes are disposed sandwiching therebetween the liquid crystal to apply a voltage across the liquid crystal, whereby orientations of the liquid crystal (LC) molecules are controlled to display an image on the front panel of the LCD device. A large number of spacers such as ball spacers or pillar spacers are disposed between both the panels to maintain a uniform cell gap irrespective of an external force being applied between the panels.

Figure 9:
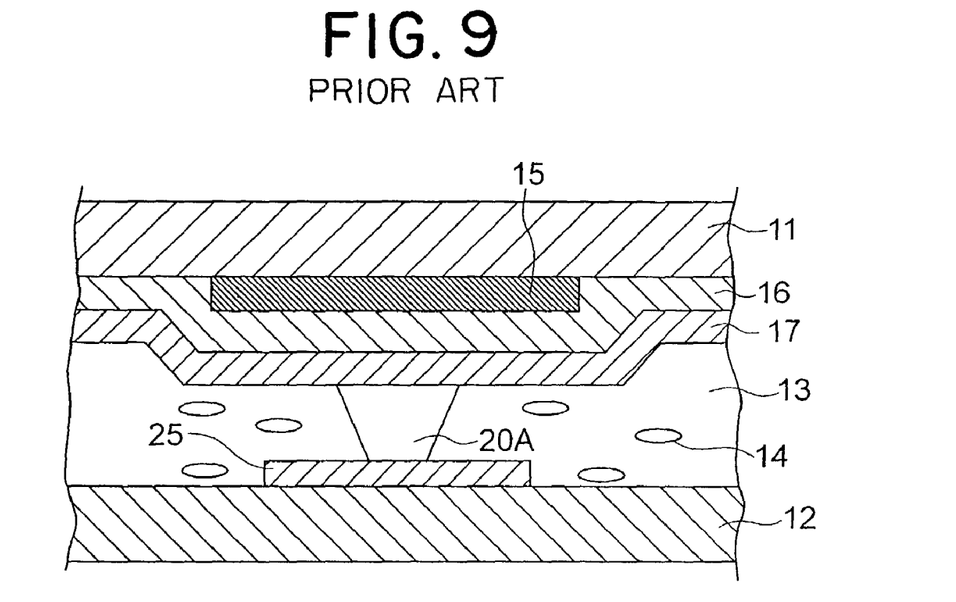
FIG. 9 is a sectional view of a conventional LCD device.

FIG. 9 shows a conventional LCD device, which includes a color filter panel including a color filter substrate 11, a TFT panel including a TFT substrate 12, and LC layer 13 encapsulated within the cell gap 13 formed between the color filter panel and the TFT panel 12. A plurality of pixels are defined on the TFT panel by electrode lines extending in the column and row directions. Each pixel includes a pixel electrode, a common electrode and a thin film transistor (TFT) for driving the pixel electrode.

A black matrix film 15, a color film 16, and an overcoat film 17 are consecutively formed on the color filter substrate 11. A gate electrode line 25 disposed for a row of TFTs is shown on the TFT substrate 12. In the region for the black matrix film 15 of the color filter substrate 11, i.e., other than the region of the effective pixel area, a pillar spacer 20A extends from the overcoat film 17 toward the TFT panel to abut the gate electrode 25 formed on the TFT substrate 12.

Figure 10:
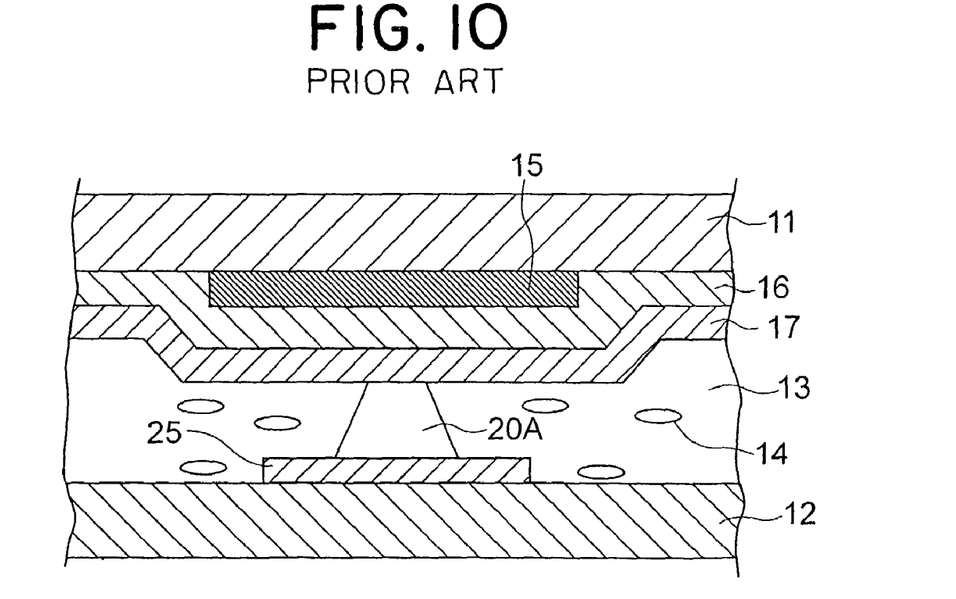
FIG. 10 is a sectional view of another conventional LCD device.

FIG. 10 shows another conventional LCD device, which is similar to the conventional LCD device of FIG. 9, except for the configuration of the pillar spacer 20A which extends from the gate electrode 25 toward the color filter panel to abut the overcoat film 17 on the color filter substrate 11 in the another conventional LCD device.

In both the conventional LCD devices of FIGS. 9 and 10, the cell gap 13 is maintained at a specified distance due to the balance between the compressive stress of the elastic pillar spacers 20A and the compressive load applied between the color filter substrate 11 and the TFT substrate 12.

There is a common problem in both the conventional LCD devices that a relatively small height of the pillar spacers 20A limited by the narrow cell gap 13 has an insufficient elastic force even though an elastic resin material is used for the pillar spacers 20A. In such a case, the pillar spacers 20A may have a larger strain for a minor deformation thereof, and may be subjected to a plastic deformation out of the elastic deformation range if the strain exceeds a specified deformation rate.

In addition, it is difficult for the pillar spacers 20A to expand and contract while following the changing distance of the cell gap 13, which changes due to the expansion and contraction of the liquid crystal 14 caused by a temperature change of the LCD device. More specifically, a higher ambient temperature of the LCD device expands the liquid crystal 14 and increases the distance of the cell gap 13 with an insufficient expansion of some pillar spacers 20A, thereby causing distortion of the display screen. On the other hand, a lower ambient temperature of the LCD device contracts the liquid crystal 14 while less contracting the pillar spacers 20A, thereby causing vacuum state of the LC layer 14 causing vacuum bubbles.

Further, an external force applied between both the substrates 11 and 12 may sometimes cause a plastic deformation of the black matrix film 15, color film 16 or overcoat film 17 due to the abutment of the pillar spacers 20A, thereby causing a local color change of the LCD device.

SUMMARY OF THE INVENTION

In view of the above, it is an object of the present invention to provide a LCD device which is capable of suppressing the deformation and color change caused by the spacers disposed in the liquid crystal.

The present invention provides a liquid crystal display (LCD) device including: first and second panels opposing each other to form a cell gap therebetween, each of the first and second panels including a substrate and at least one first film overlying the substrate adjacent to the cell gap; liquid crystal filled in the cell gap; and a plurality of pillar spacers disposed within the liquid crystal between the first panel and the second panel, the pillar spacer being in contact with the first panel at a position exposed from an opening formed in the first film.

In accordance with the LCD device of the present invention, the height of the pillar spacers can be increased by the thickness of the first film due to provision of the opening in the first film, whereby the pillar spacers have a large elastic force and thus alleviate the variation of the cell gap. The pillar spacers may be formed on either the first panel or the second panel.

The above and other objects, features and advantages of the present invention will be more apparent from the following description, referring to the accompanying drawings.

PREFERRED EMBODIMENTS OF THE INVENTION

Now, the present invention is more specifically described with reference to accompanying drawings, wherein similar constituent elements are designated by similar reference numerals.

Figure 1:
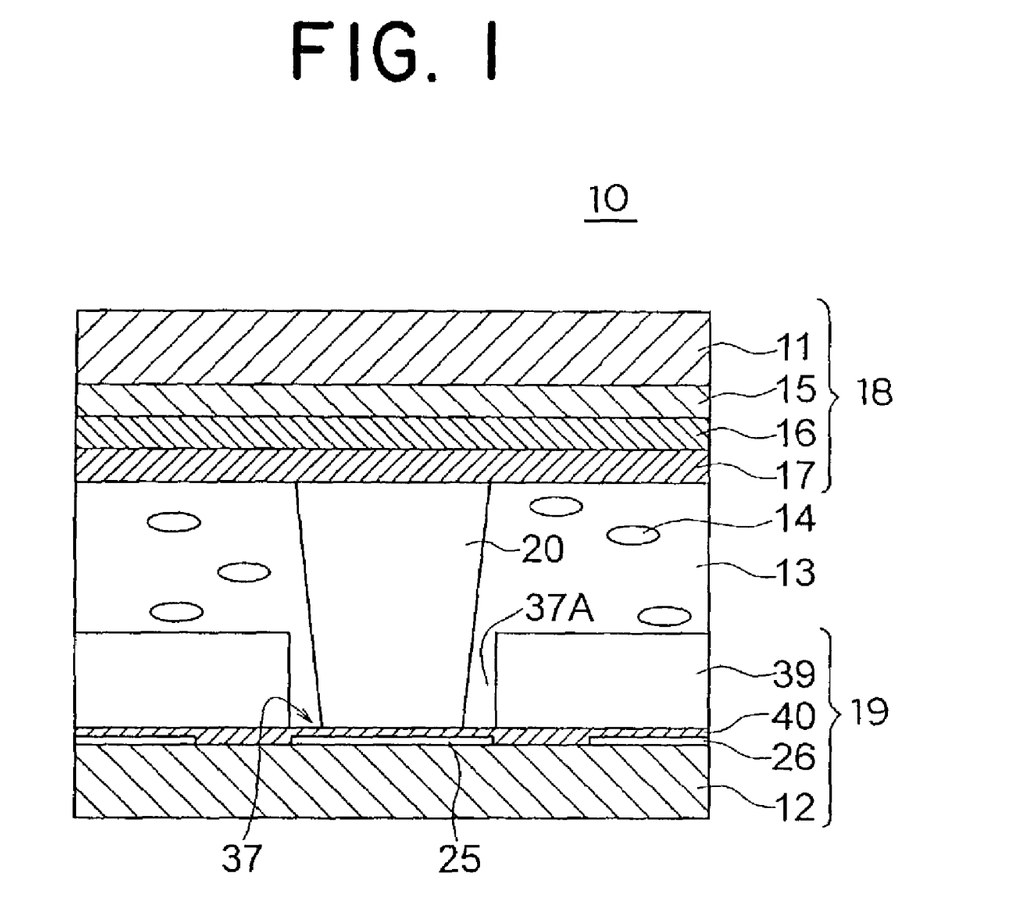
FIG. 1 is a sectional view of a LCD device according to a first embodiment of the present invention.

Referring to FIG. 1, a LCD device or LCD panel assembly, generally designated by numeral 10, according to a first embodiment of the present invention includes a color filter panel 18 including a color filter substrate 11, a TFT panel 19 including a TFT substrate 12, and a LC layer including LC molecules 14 and filled in the cell gap 13 between the color filter panel 18 and the TFT panel 19. It is to be noted that some films such as an orientation film are omitted therein for a simplification purpose. The LCD device 10 has a relatively higher value for the effective opening ratio and operates in an in-plane switching (IPS) mode.

The color filter substrate 11 mounts thereon a black matrix film 15, a color film 16 and an overcoat film 17 deposited on the color filter substrate 11 in this order. In the region where the black matrix film 15 is formed, aplurailty of pillar spacers 20 are formed on the overcoat film 17 at specified positions thereof, and extend toward the TFT panel 19. The top of the pillar spacer 20 abuts a gale insulation film 40 formed on the TFT substrate 12. The pillar spacer 20 has a shape of trapezoid in the longitudinal section thereof and a shape of an ellipse in the cross section thereof. The pillar spacer 20 is made of acrylic photosensitive resin of negative type, for example. The acrylic photosensitive resin may be NN-777™ supplied from JSR (Japan Synthetic Rubber) Corporation.

A plurality of gate electrode lines 25 and a plurality of common electrode lines 26 extend parallel to one another on the TFT substrate 12. An organic insulator film 39 are formed on the gate insulation film 40 covering the gate electrode lines 25 and the common electrode lines 26. The organic insulator film 39 has therein a plurality of openings 37A each exposing a portion of the gate insulation film 40 at which the pillar spacer 20 abuts the gate insulation film 40.

Figure 2:
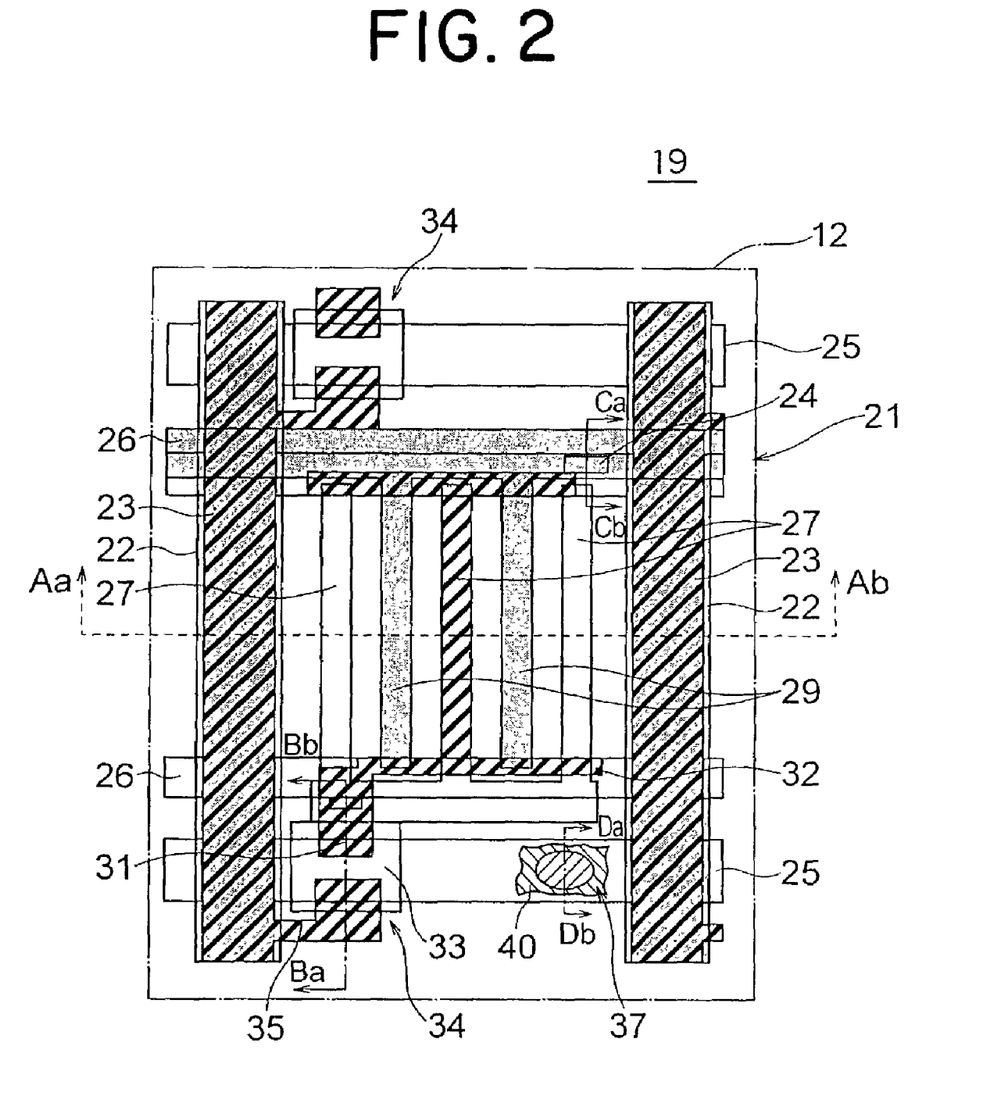
FIG. 2 is a front view of the TFT panel showing detail of one of the pixels formed on the TFT substrate shown in FIG. 1.

Referring to FIG. 2, the TFT panel 19 in the LCD device 10 of the present embodiment has conductor lines including a plurality of first common electrode lines 22 extending in the column direction, a plurality of data lines 23 extending below the respective first common electrode lines 22, a plurality of gate electrode lines 25 extending in the row direction, and a plurality of second common electrode lines 26 extending parallel to the gate electrode lines 25 and connected to the first common electrode lines 22 via through-holes. The first common electrode lines 22 and the second common electrode lines 26 define an array of pixel areas.

In each pixel area, a plurality of teeth of a comb-shape pixel electrode 27 extend parallel to a plurality of teeth of a comb-shape common electrode 29, which is connected to one of the second common electrode lines 26. Each pixel has a TFT 34 which includes a gate electrode as a part of the gate electrode line 25, a source electrode 31 from which the comb-shape pixel electrode 27 extends, and a drain 35 connected to a corresponding data line 23.

As described above, the pillar spacer 20 abuts the gate insulation film 40. In other words, the pillar spacer 20 abuts the gate electrode 25 via the gate insulation film 40 at a portion exposed from the opening 37A of the organic insulator film 39. The location of the abutment by the top 37 of the pillar spacer 20 resides outside the pixel area, and resides on the gate electrode line 25 having a relatively higher degree of hardness.

Figure 3A:
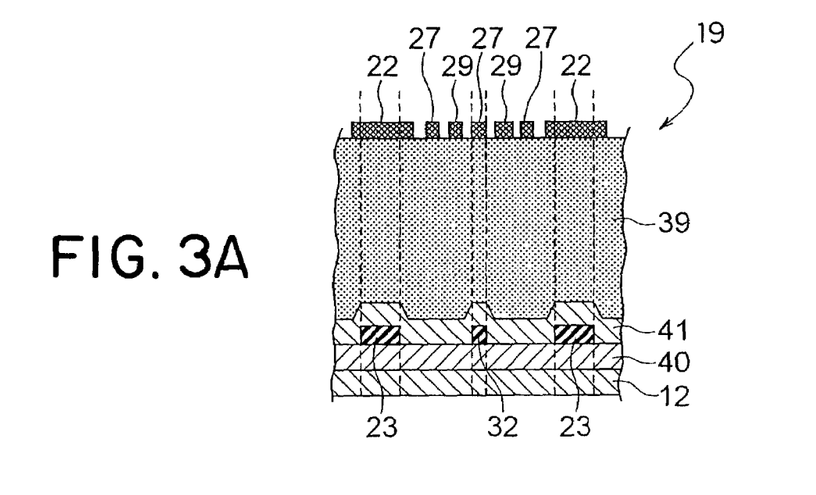
FIGS. 3A, 3B and 3C are sectional views of the TFT panel taken long lines Aa-Ab, Ba-Bb and Ca-Cb, respectively, in FIG. 2.
Figure 3B:
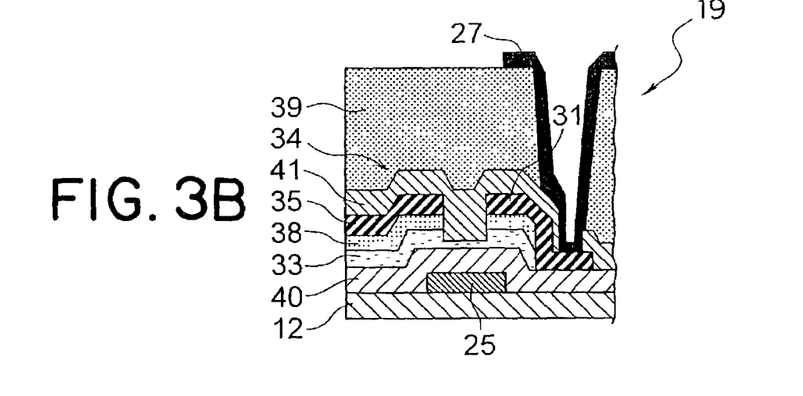
Figure 3C:
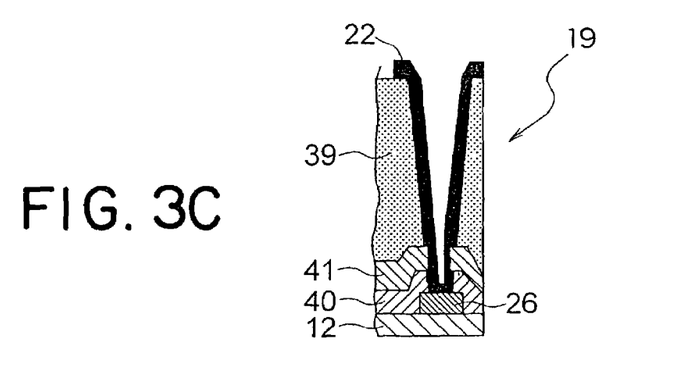

FIGS. 3A to 3C show respective sections of the TFT panel 19 shown FIG. 1, taken along lines Aa-Ab, Ba-Bb and Ca-Cb, respectively, in FIG. 2. It is to be noted that FIG. 1 is taken along line Da-Db passing through the pillar spacer 20 in FIG. 2. In the pixel area shown in FIG. 3A, the gate insulation film 40, an inorganic insulator film 41 and the organic insulator film 39 are consecutively formed on the TFT substrate 12. The first common electrode lines 22, common electrodes 29 and pixel electrodes 27 made of transparent indium-tin-oxide (ITO) are formed on the organic insulator film 39.

In the TFT region of FIG. 3B, the gate insulation film 40, an amorphous silicon layer 33, an interlayer dielectric film 38, source/drain electrodes 35 and 31, the inorganic insulator film 41 and the organic insulator film 39 are consecutively formed on the TFT substrate 12. In the pixel area shown in FIG. 3C, the gate insulation film 40, inorganic insulator film 41 and organic insulator film 39 are formed in this order on the TFT substrate 12.

As will be understood from FIGS. 3A to 3C, these regions of the TFT panel 19 are not suited for disposing the pillar spacers 20 because the gate electrode line 25 having a higher degree of hardness is not exposed after the organic insulator film 39 alone is etched. Thus, the region shown in FIG. 1, i.e., the region on the gate electrode line 25 shown in FIG. 2 is used for disposing the pillar spacer 37 because the thin gate oxide film 40 covering the gate electrode line 25 is exposed after the organic insulator film 39 alone is removed.

In the present embodiment, as understood from FIGS. 3A to 3B, the pillar spacers 20 are not disposed in the vicinity of the TFT 34 where the gate electrode, source electrode 31 and drain electrode 35 meet with one another. This configuration suppresses a change of the transistor characteristics of the TFT 34 due to electrification of the insulator film caused by friction of the pillar spacer 20.

In addition, since the pillar spacer 20 is not disposed in the vicinity of a step difference on the exposed surface such as a through-hole, the height of the pillar spacer 20 can be maintained accurate, whereby the distance of the cell gap 13 can be accurate. This also reduces the possibility of friction by the pillar spacer 20 in the direction parallel to the panel surface during the fabrication, and alleviates the difficulty in the step of bonding both the panels together. Although the presence of the pillar spacer 20 in the present embodiment makes it difficult to correct the positional relationship between both the panels 18 and 19 after the bonding thereof, this may suppress the occurrence of leakage light by suppressing the correction itself of the positional relationship.

Figure 4:
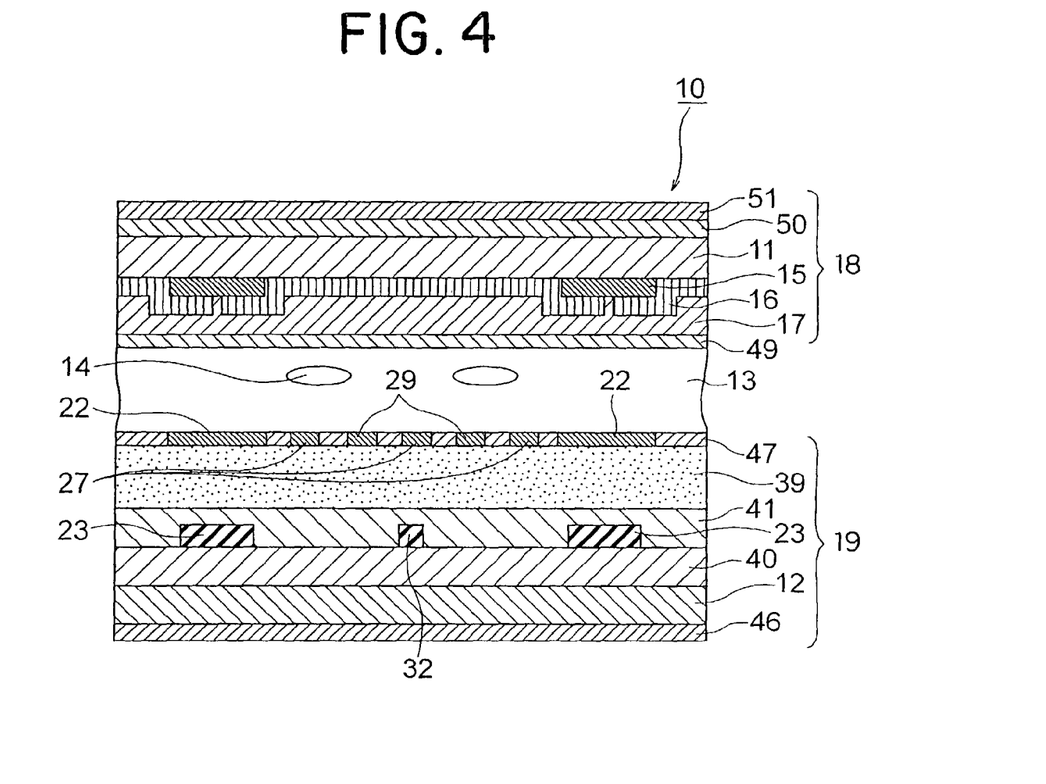
FIG. 4 is another sectional view of the LCD device of FIG. 1 taken along another line.

Referring to FIG. 4, there is shown another section of the LCD device of FIG. 1, wherein the pillar spacer 20 is not disposed. The TFT substrate 12 mounts a polarizing plate 46 on the external surface thereof, and mounts the gate insulation film 40, inorganic insulator film 41, organic insulator film 39 and an orientation film 47 consecutively formed on the internal surface of the TFT substrate 12.

The color filter substrate 11 mounts conductive films 50 and 51 on the external surface thereof, and consecutively mounts the black matrix film 15, the color film 16 which is either red, green or blue, the overcoat film 17 and an orientation film 49 on the internal surface of the color filter substrate 11. Between both the orientation films 47 and 49, the cell gap 13 receives therein liquid crystal 14.

The process for forming the pillar spacers 20 in the present embodiment will be described hereinafter, with reference to FIG. 4. A gate insulation film 40, an inorganic insulator film 41, an organic insulator film 39 and an orientation film 47 are consecutively formed on a TFT substrate 12, followed by patterning the orientation film 47 and the organic insulator film 39 to form openings (37A in FIG. 1) therein at specified locations.

A black matrix film 15, one of color films 16 and an overcoat film 17 are consecutively formed on a color filter substrate 11, followed by coating the overcoat film 17 with an acrylic photosensitive resin of negative type. The acrylic photosensitive resin film is then subjected to exposure and development for patterning to form pillar spacers 20 having a uniform height. Since the pillar spacers 20 have a larger height by a value corresponding to the thickness of the organic insulator film 39 compared to the conventional pillar spacers 20A, the pillar spacers 20 in the present embodiment have a higher elasticity over the conventional LCD device. The larger elasticity of the pillar spacers 20 supports the cell gap 13 with superior stability.

Thereafter, the color filter panel 18 including the substrate 11 and the TFT panel 19 including the substrate 12 are bonded together with a cell gap distance of several micrometers. Liquid crystal 14 is then injected into the cell gap 13 and encapsulated therein by sealing the outer periphery of the resultant panels 18 and 19.

In the configuration of the present embodiment, the height of the pillar surfaces 20 is increased by forming an opening 37A in the organic insulator film 39 on the TFT substrate 12. This reduces the strain of the pillar spacers 20 with respect to a specified amount of depression or contraction. That is, the pillar spacers 20 have a larger elasticity and a larger maximum amount of elastic deformation, whereby the liquid crystal 14 expanding or contracting due to rise or fall of the ambient temperature allows the pillar spacers 20 to suitably follow the expansion and the contraction of the cell gap 13. This prevents a defect on the display screen at a higher temperature, and prevents vacuum bubbles in the liquid crystal 14 at a lower temperature.

In the structure wherein the pillar spacers 20 abut the gate electrode 25 with an intervention of an inorganic gate insulator film 40, the cell gap 13 is assured to have a more uniform distance compared to the case that the pillar spacers abut the organic insulator film 39 having a lower degree of hardness.

In the structure of the above embodiment, the pillar spacers 20 are formed on the overcoat film 17 on the color filter panel 18. However, the pillar spacers 20 may be formed on the color film 16 or the black matrix film 15 exposed from an opening formed in the overcoat film 17 or an opening formed in the overcoat film 17 and the color film 16. This further increases the height of the pillar spacers 20 and increases the elasticity of the pillar spacers 20.

Figure 5:
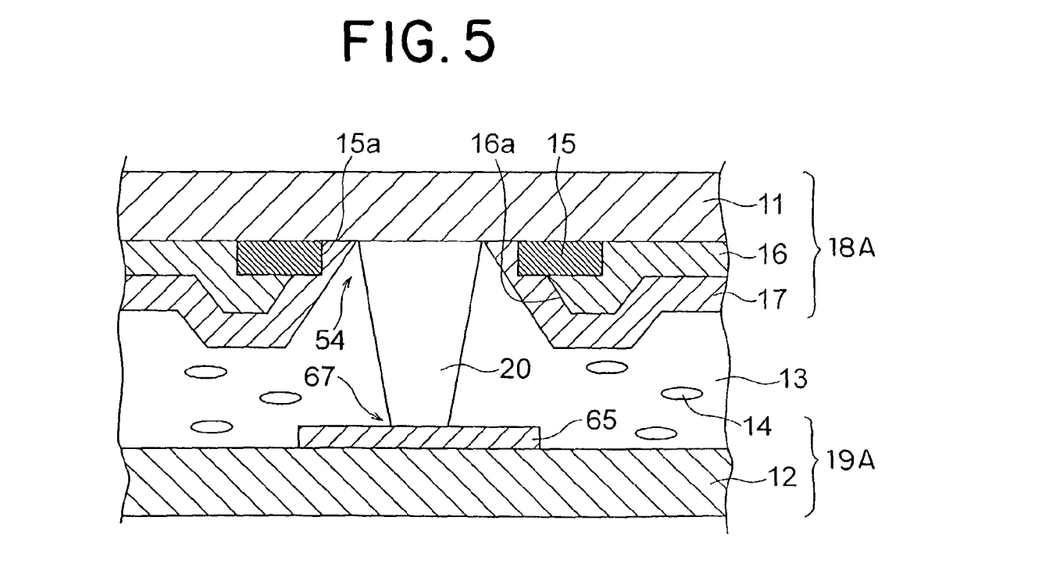
FIG. 5 is a sectional view of a LCD device according to a second embodiment of the present invention.

Referring to FIG. 5, a LCD panel according to a second embodiment of the present invention is similar to the LCD panel of the first embodiment except for the operational mode of the LCD panel and the substrate on which the pillar spacers are formed. The LCD panel of the present embodiment operates with a twisted nematic mode. It is to be noted that depiction of the organic insulator film 39 is omitted in the drawing for a simplification purpose.

The black matrix film 15, color film 16 and overcoat film 17 consecutively formed on the inner surface of the color filter substrate 11 have openings 54 therein at the locations opposing the gate electrode 65 on the TFT panel 19A. The opening 54 is implemented by forming an opening 15a in the black matrix film 15, forming an opening 16a overlapping the opening 15a and patterning the overcoat film 17 to etch the same at the opening 16a. The opening 54 exposes therefrom a portion of the color filter substrate 11, on which a pillar spacer 20 is formed. The pillar spacer 20 extends from the color filter panel 18A toward the TFT panel 19A and directly abuts the gate electrode line 65.

Figure 6A:
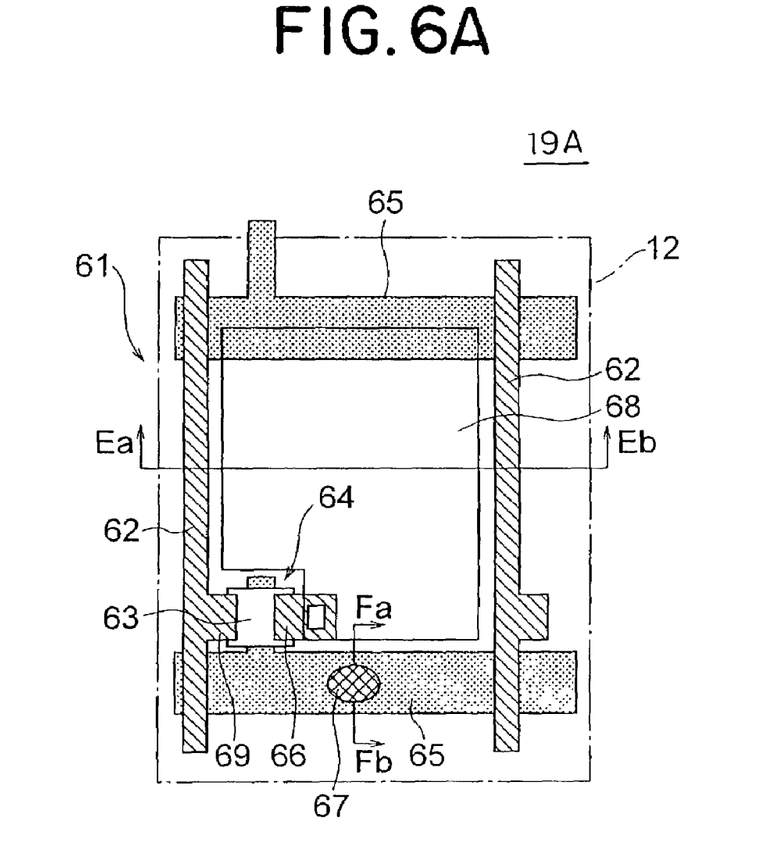
FIG. 6A is a front view of the TFT panel showing one of the pixels formed on the TFT substrate shown in FIG. 5.

Referring to FIG. 6A, the TFT substrate 11 in the second embodiment mounts thereon a plurality of data lines 62 extending in the column direction, a plurality of gate electrode lines 65 extending in the row direction, and a plurality of pixels defined by adjacent gate electrode lines 65 and adjacent data lines 62. Each pixel includes a transparent pixel electrode 68 having an area substantially equal the effective area of the pixel, and a TFT 64 disposed at a corner portion of the pixel in association with the pixel electrode 68. The TFT 64 includes a gate electrode extending from a corresponding gate electrode line 65, a source electrode connected to a corresponding pixel electrode 68 and a drain electrode 69 extending from a corresponding data line 62.

Figure 6B:
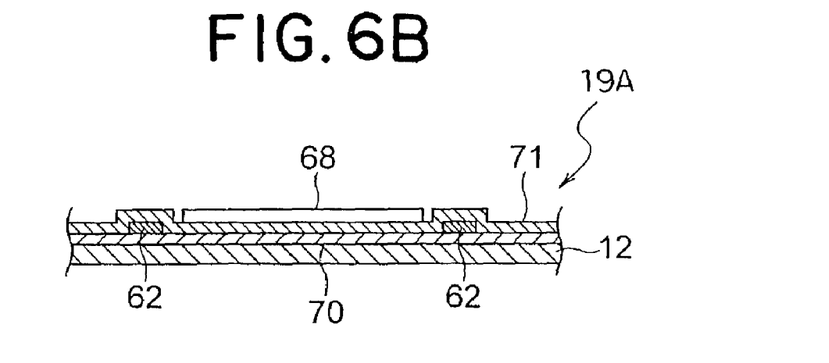
FIG. 6B is a sectional view taken along line Ea-Eb in FIG. 6A.

Referring to FIG. 6B depicting the TFT panel 19A shown in FIG. 6A, a gate insulation film 70 is formed on the TFT substrate 12, allowing the data lines 62 to extend thereon. A thin inorganic insulator film 71 is formed on the gate insulation film 70 and the data lines 62, and a transparent pixel electrode 68 is formed on the thin inorganic film 71 at the location defined by the adjacent data lines 62.

The pillar spacers 20 are disposed outside the pixel area, i.e. the area for the pixel electrode, and have respective top surfaces 67 abutting the gate electrode lines 65 having a higher degree of hardness.

Figure 7:
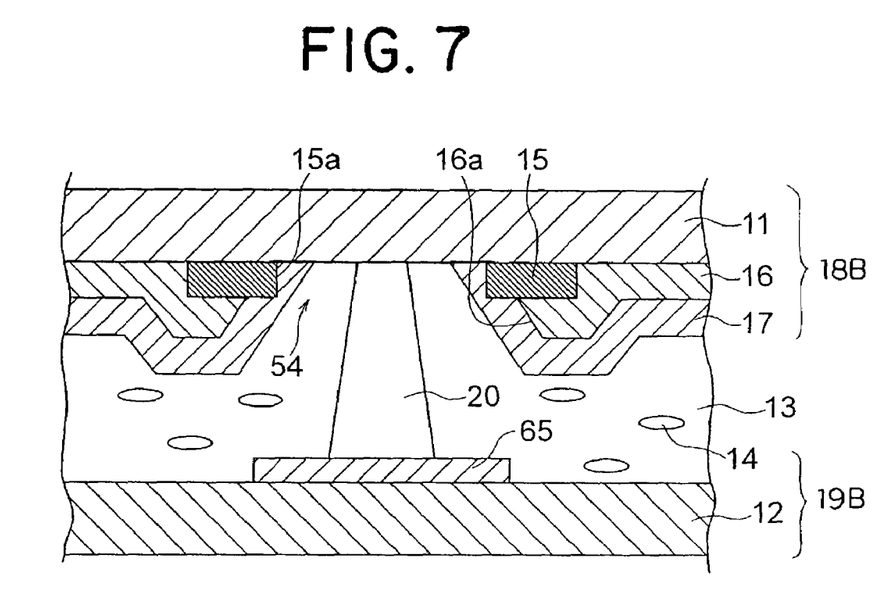
FIG. 7 is a sectional view of a modification from the LCD device of the second embodiment.

Referring to FIG. 7, a modification from the second embodiment is such that the pillar spacer 20 is formed on the gate electrode line 65, extends and abuts a portion of the color filter substrate 11 exposed from the opening 54 which is similar to the opening 54 in FIG. 5.

Figure 8:
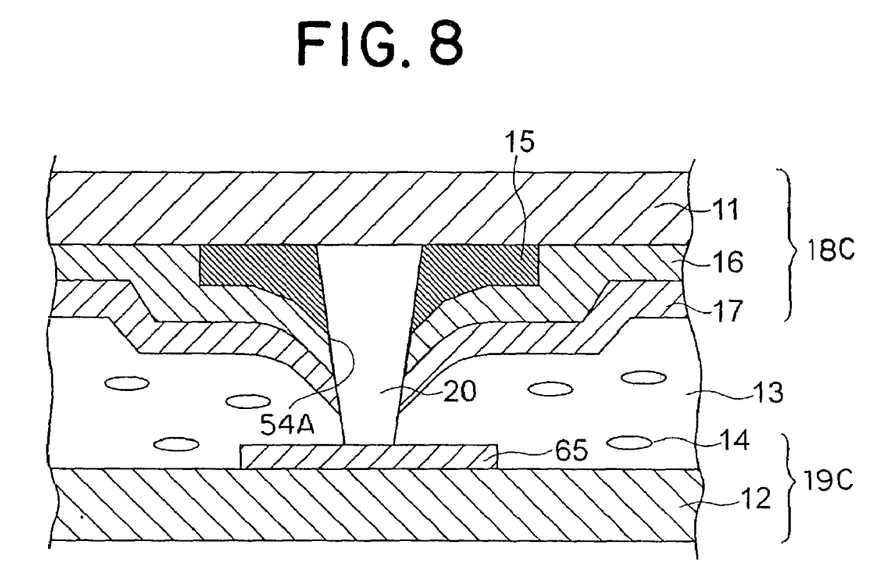
FIG. 8 is a sectional view of another modification from the LCD device of the second embodiment.

Referring to FIG. 8, another modification from the second embodiment is such that the pillar spacer 20 penetrates the black matrix film 15, color film 16 and overcoat film 17 at an opening 54A, to abut the gate electrode line 65 formed on the TFT panel 19C. More specifically, the pillar spacers 20 are formed on the color filter substrate 11 before the black matrix film 15, color film 16 and overcoat film 17 are formed. The pillar spacers 20 are made of a material having a lower wettability to the materials for the black matrix film 15, color film 16 and overcoat film 17. Examples of such material for the pillar spacers 20 include silicon-based resins and fluorine-based resins, such as having a contact angle of 30 degrees or higher with respect to water. The material having a lower wettability may be used for the entire body of the pillar spacer 20 or may be used as a coat film for coating the surface of the body of the pillar spacer 20.

In the another modification shown in FIG. 8, after the pillar spacers 20 are formed on the color filter substrate 11, the black matrix film 15, color film 16 and overcoat film 17 are consecutively and selectively formed in the area other than the areas where the pillar spacers 20 are formed, thereby allowing the pillar spacers 20 protruding from the overcoat film 17 at the opening 54A to abut the gate electrode line 65 on the TFT panel 19C. This also increases the effective height of the pillar spacers 20 acting as elastic members.

As described above, the present invention achieves suppression of a defect in the display panel or variation of brightness caused by insufficient elasticity of the pillar spacers.

Since the above embodiments are described only for examples, the present invention is not limited to the above embodiments and various modifications or alterations can be easily made therefrom by those skilled in the art without departing from the scope of the present invention.

What is claimed is:

1. A liquid crystal display (LCD) device comprising:
    first and second panels opposing each other to form a cell gap therebetween, each of said first and second panels including a substrate and at least one first film overlying said substrate adjacent to said cell gap;
    liquid crystal filled in said cell gap; and
    a plurality of pillar spacers disposed within said liquid crystal between said first panel and said second panel, said pillar spacers being in contact with said first panel at a position which is exposed from an opening formed in said first film,
    wherein said first and second panels comprise a thin film transistor (TFT) panel and a color filter panel, respectively, and said first film includes an organic insulator film.

2. The LCD device as defined in claim 1, wherein said pillar spacers are disposed on said second panel, and abut said first panel.

3. The LCD device as defined in claim 1, wherein said pillar spacers are disposed on said first panel, and abut said second panel.

4. A liquid crystal display (LCD) device comprising:
    first and second panels opposing each other to form a cell gap therebetween, each of said first and second panels including a substrate and at least one first film overlying said substrate adjacent to said cell gap;
    liquid crystal filled in said cell gap; and
    a plurality of pillar spacers disposed within said liquid crystal between said first panel and said second panel, said pillar spacers being in contact with said first panel at a position which is exposed from an opening formed in said first film,
    wherein said first and second panels comprise a color filter panel and a thin film transistor (TFT) panel, respectively, and said at least one first film includes a black matrix film, a color film and an overcoat film.

5. The LCD device as defined in claim 4, wherein said opening is formed by patterning said black matrix film, said color film and said overcoat film.

6. The LCD device as defined in claim 4, wherein said opening is formed by forming said black matrix film, said color film and said overcoat film after forming said pillar spacers.

7. The LCD device as defined in claim 6, wherein at least a surface of said pillar spacers comprises a material including a contact angle equal to or greater than 30 degrees with respect to water.

8. The LCD device as defined in claim 4, wherein said pillar spacers are disposed in regions corresponding to locations of said black matrix film.

9. A liquid crystal display (LCD) device comprising:
    first and second panels opposing each other to form a cell gap therebetween, each of said first and second panels including a substrate and at least one first film overlying said substrate adjacent to said cell gap;
    liquid crystal filled in said cell gap; and
    a plurality of pillar spacers disposed within said liquid crystal between said first panel and said second panel, said pillar spacers being in contact with said first panel at a position which is exposed from an opening formed in said first film,
    wherein said pillar spacers contact said second panel at a position exposed from an opening formed in said first film of said second panel.

10. A liquid crystal display (LCD) device comprising:
    first and second panels opposing each other to form a cell gap therebetween, each of said first and second panels including a substrate and at least one first film overlying said substrate adjacent to said cell gap;
    liquid crystal filled in said cell gap; and
    a plurality of pillar spacers disposed within said liquid crystal between said first panel and said second panel, said pillar spacers being in contact with said first panel at a position which is exposed from an opening formed in said first film,
    wherein said pillar spacers pierce through said first film and contact said first panel.

11. The LCD device as defined in claim 10, wherein said pillar spacers are disposed at a location outside at least one of an area where a thin film transistor is formed and a vicinity thereof.

12. The LCD device as defined in claim 10, wherein said pillar spacers are not formed in at least one of an area of a step difference and a vicinity thereof.

13. The LCD device as defined in claim 10, wherein said pillar spacers are disposed outside a pixel area.

14. The LCD device as defined in claim 10, wherein said pillar spacers comprise a trapezoidal cross-section in a longitudinal direction of said pillar spacers.

15. The LCD device as defined in claim 10, wherein said pillar spacers comprise an elliptical cross-section in a direction transverse to a longitudinal direction of said pillar spacers.

16. The LCD device as defined in claim 10, wherein said pillar spacers comprise an acrylic photosensitive resin.

17. The LCD device as defined in claim 10, wherein said pillar spacers comprise at least one of a silicon-based resin and a fluorine-based resin.

18. The LCD device as defined in claim 10, wherein said pillar spacers comprise a material having a low wettability.

19. The LCD device as defined in claim 10, wherein said pillar spacers further comprise a coat film coating a surface of said pillar spacers, and
    wherein said coat film comprises a material having a low wettability.

20. The LCD device as defined in claim 10, said pillar spacers each being surrounded by the liquid crystal.

21. The LCD device as defined in claim 10, said pillar spacers having a plurality of sides in contact with the liquid crystal.

* * * * *